United States Patent
Wood et al.

(10) Patent No.: US 9,996,840 B2
(45) Date of Patent: *Jun. 12, 2018

(54) SYSTEMS AND METHODS FOR AUTHENTICATING GOODS

(71) Applicant: Covectra, Inc., Westborough, MA (US)

(72) Inventors: Stephen M. Wood, Waterford, CT (US); Richard Smith, Pottstown, PA (US); Terrence P. O'Neill, Plymouth, MA (US); Ronald Guido, Annandale, NJ (US)

(73) Assignee: Covectra, Inc., Westborough, MA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/609,237

(22) Filed: May 31, 2017

(65) Prior Publication Data

US 2017/0330198 A1    Nov. 16, 2017

Related U.S. Application Data

(63) Continuation of application No. 14/334,194, filed on Jul. 17, 2014, now Pat. No. 9,697,526.

(60) Provisional application No. 61/847,216, filed on Jul. 17, 2013.

(51) Int. Cl.
*G06Q 30/00* (2012.01)
*G06K 7/10* (2006.01)
*G06K 7/14* (2006.01)

(52) U.S. Cl.
CPC ....... *G06Q 30/018* (2013.01); *G06K 7/10366* (2013.01); *G06K 7/1413* (2013.01); *G06K 7/1417* (2013.01)

(58) Field of Classification Search
CPC .. G06Q 30/0185; G06Q 99/00; G06Q 30/018; G06K 7/1417; G06K 7/10366; G06K 7/1413
See application file for complete search history.

(56) References Cited

U.S. PATENT DOCUMENTS

2014/0201094 A1*  7/2014  Herrington .......... G06Q 30/018
                                                        705/317

* cited by examiner

*Primary Examiner* — Sonji Johnson
(74) *Attorney, Agent, or Firm* — Cooley LLP

(57) ABSTRACT

An item can be authenticated based on a first, second, third, and fourth identifier, wherein the identifiers are incorporated into various parts of product packaging. In some embodiments, the first, second, and fourth identifiers can be a QR code, a bar code, a serial number, any RFID tag, or a combination thereof, and the third identifier can be an image type, for example, a type of animal, and image location, for example, a quadrant. The identifiers can be scanned or inputted manually by a user. When the four identifiers are authenticated, the product is deemed to be authentic, whereas when the four identifiers are not authenticated, the product is deemed to be counterfeit. In some implementations, a user can authenticate the items using a smart phone, smart phone app, tablet, tablet app, website, web-based application, and/or the like.

23 Claims, 4 Drawing Sheets

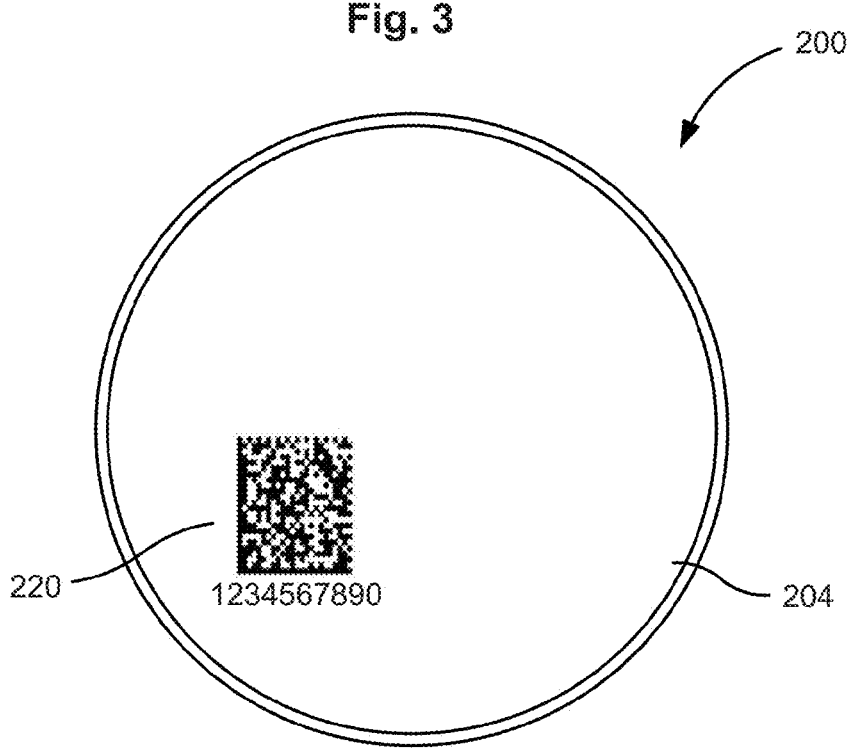
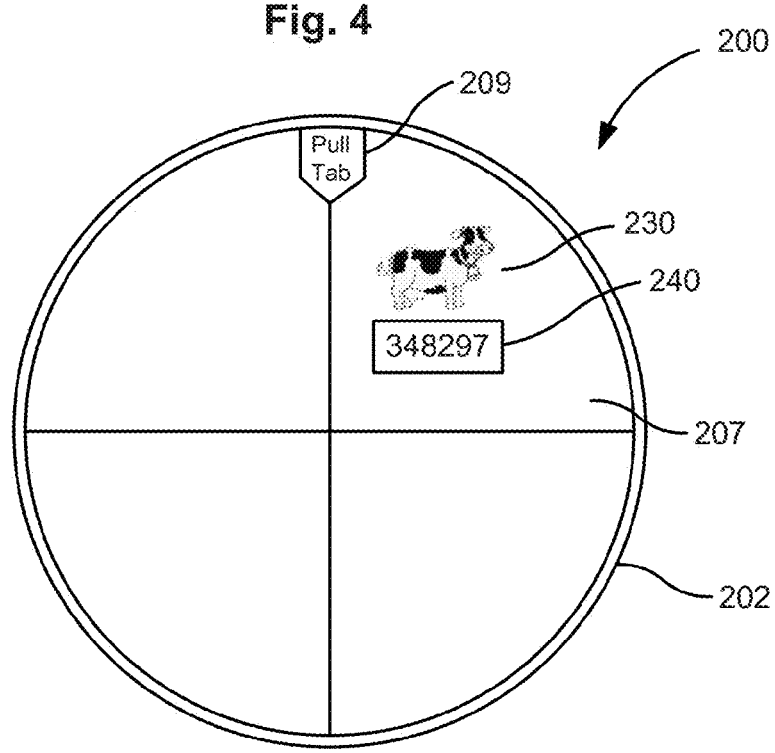

SYSTEMS AND METHODS FOR AUTHENTICATING GOODS

PRIORITY CLAIM

This application is a continuation of U.S. patent application Ser. No. 14/334,194, filed Jul. 17, 2014, entitled "Systems and Methods for Authenticating Goods," now U.S. Pat. No. 9,697,526, which claims priority to and benefit of U.S. Provisional Application Ser. No. 61/847,216, filed Jul. 17, 2013, entitled "Systems and Methods for Authenticating Goods," the disclosures of which are hereby incorporated by reference in their entirety.

BACKGROUND

Embodiments described herein relate generally to systems, and methods for identifying and authenticating goods to prevent counterfeiting, and in particular identifying and authenticating a product using a combination of identifiers associated with the product.

Product counterfeiting is a major concern for manufacturers. It affects legitimate companies by violating their trademarks, devaluing corporate reputation, and can result in substantial lost revenue for companies. The trade undercuts jobs that would otherwise be offered by legitimate companies. In some cases, the trade involves a highly sophisticated network of organized crime, whose money may go for terrorism. Additionally, particular counterfeit products, for example, baby formula, pharmaceutical drugs and medical devices, and other products deemed for human consumption, can endanger the safety and well-being of people consuming the counterfeit products. In the global market, as counterfeiting technologies become more sophisticated, it is becoming increasingly difficult to determine whether a good delivered to a consumer is authentic.

A known method for preventing counterfeiting of products, for example, consumer products, is serialization. Serialization is the process of creating and applying unique traceable identifiers, for example, bar codes, QR codes, serial numbers, RFIDs, or any other identifiers on the product such that the product can be traced back to its origin at any point in the supply chain. In general, each level of packaging has a single unique identifier associated with it, which can be used to trace the product back to its origin. In some known instances, the level of protection against counterfeiting provided by a single identifier, for example, a single bar code on the product container is not sufficient. For example, counterfeits of known consumer products such as baby formula, are readily available in the Chinese market, and current identifiers provided on the consumer products are not able to prevent counterfeiting of such known products. Such counterfeit products can result in bodily harm and even death, as is evident by the death of Chinese babies due to consumption of counterfeit baby formula. Counterfeiting of such products is particularly difficult to identify at the point of sale, for example, at retail outlet or online stores with existing technology.

Therefore, there is a need for new systems, and methods for identification and authentication of consumer products to effectively prevent counterfeiting of consumer goods.

SUMMARY

In order to determine that an item is authentic and is not counterfeit, identifiers can be placed on various, specified locations on a container and/or product packaging. In some implementations, four identifiers can be used, each placed at a specific location on the container and/or product packaging. In some embodiments, the first, second, and fourth identifiers can be a QR code, a 2D data matrix bar code, a serial number, any RFID tag, or a combination thereof, and the third identifier can be an image type, for example, a type of animal, and image location, for example, a quadrant on a seal that covers the container. In some embodiments, a smart phone, smart phone app, tablet, tablet app, website, web-based application, and/or the like can be used to authenticate the item based on the four identifiers. If all four identifiers are authenticated, the product is authentic, and a user is notified that the product is ok to use. If any of the identifiers are not authenticated, the product is determined to be counterfeit, and the user is notified.

BRIEF DESCRIPTION OF THE DRAWINGS

FIG. 3 is a bottom view of the container of FIG. 2

FIG. 4 is a top view of the container of FIG. 2

DETAILED DESCRIPTION

Most known products, for example, baby formula, baby food, cereal, shampoos, conditioners, medical products, and the like, are provided with a unique identifier, for example, a unique serialized bar code on the product container. This unique identifier is then used to authenticate and/or trace the product in the supply chain to ensure that an authentic product is delivered to the consumer. In some known instances, a single identifier is not sufficient to prevent counterfeiting of the product. As counterfeiting technologies have become more sophisticated, such known single identifiers can be duplicated and used on numerous packages to bypass known authentication systems.

Systems and authentication methods described herein include a plurality of unique identifiers on a single container, for example, a baby formula container, that can be used in combination to determine the authenticity of the product. Systems and methods for authentication of products described herein, provide several advantages including, for example: 1) a plurality of unique identifiers to provide multiple levels of protection against counterfeiting; 2) serialization and authentication data stored on a secure cloud database separate from retail store database; 3) combination of QR codes, serial number, and image identifiers provides enhanced protection against counterfeiting and makes the identifiers very hard to replicate; 4) the identifiers can be used for tracking/tracing as well as authenticating the product, and; 5) the system and method can be easily integrated with existing tracking/tracing, serialization, and aggregation systems. Examples of such tracking/tracing, serialization, and aggregation systems are described in U.S. patent application Ser. No. 13/507,320, filed Jun. 21, 2012, entitled "Systems and Methods for Tracking and Authenticating Goods," and U.S. Provisional Application No. 61/833,569, filed Jun. 11, 2013, entitled "Systems and Methods for Aggregating Serialized Goods," and PCT/US2014/041873, filed Jun. 11, 2014, entitled "Systems and Methods for Aggregating Serialized Goods" the disclosures of each of which are hereby incorporated by reference in their entirety.

Figure 1:
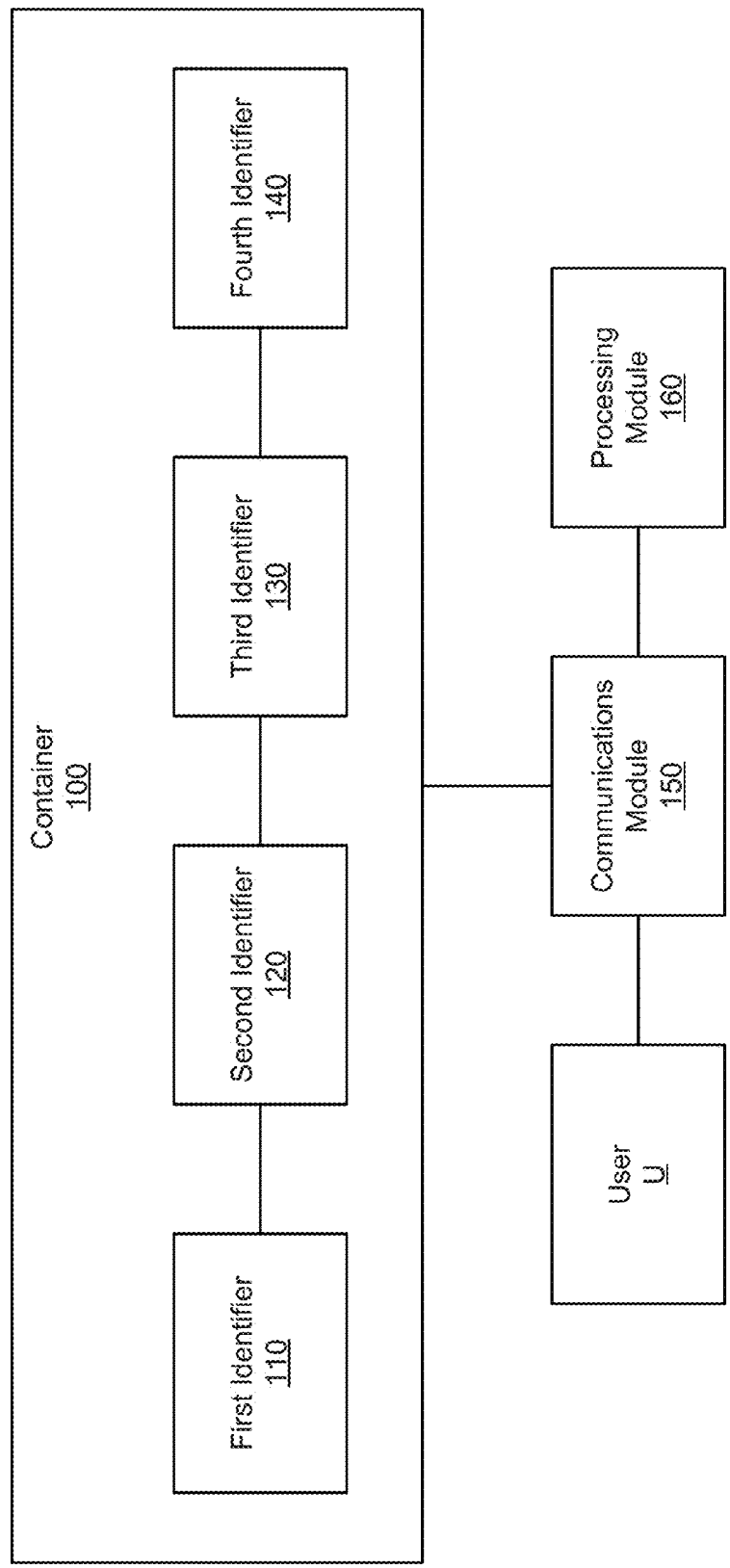
FIG. 1 is a schematic illustration of a container according to an embodiment.

FIG. 1 shows a schematic block diagram of a container 100 that includes a plurality of identifiers associated with the container. The plurality of identifiers are operable to authenticate the container 100. In some embodiments, the plurality of identifiers are operable to authenticate the container when authenticated in a predetermined order. The container 100 includes a first identifier 110, a second identifier 120, a third identifier 130 and a fourth identifier 140. In some embodiments, the container is authenticated when a first identifier 110, second identifier 120, third identifier 130 and fourth identifier 140 are each authenticated in a successive order. In some implementations, a user U can interact with each of the identifiers in a predetermined sequence. Information about each of the identifiers can be communicated by a communications module 150 to a processing module 160 to determine the authenticity of the container 100, as described herein. In some implementations, the processing module 160 may be incorporated into an authentication device, while in some embodiments, the communications module 150 communicates the information about each of the identifiers to a processing module 160 that is separate from the authentication device.

The container 100 can be of any shape, size, or material such as, for example, a cylindrical container, square container, rectangular container, metal can, cardboard box, a bottle, a vial, or any other suitable container. The container 100 can be configured to contain any product, for example, baby formula, baby cereal, supplements, milk, cookies, beverages, hair products, pharmaceuticals, diagnostic devices or supplies, or any other consumer product(s). The container 100 can include a lid (not shown) and, in some embodiments can also include a security/moisture protection seal (not shown) such as, for example, a plastic sheet, metal foil, or any other suitable seal or combination thereof, disposed on the container 100 below the lid. Presence of the security seal ensures that the product housed within the container 100 cannot be accessed until the security seal is broken. A tamper-evident safety tab (not shown), for example, a strip of paper, plastic, metal, or any other suitable material, can also be disposed on a sidewall of the container 100, such that at least a portion of the safety tab is also disposed on the lid of the container 100. The safety tab ensures that the lid cannot be opened without breaking the safety tab, thereby providing an additional level of security against counterfeiting.

The first identifier 110 can be any suitable identifier, for example, a QR code, a bar code, a serial number, any RFID tag, or a combination thereof. The first identifier 110 can be disposed on a sidewall of the container 100, or on a base of the container 100.

The second identifier 120 can be any suitable identifier, for example, a QR code, a bar code, a serial number, any RFID tag, or a combination thereof. The second identifier 120 can be disposed on a sidewall of the container 100, or on the base of the container 100.

The third identifier 130 can include a visual identifier, for example, an image located at a predetermined portion on the security seal of the container 100, for example, top right corner, bottom right corner, top left corner, bottom left corner, a quadrant of the security seal, center of the security seal, or any other random position on the security seal. The image included in the third identifier 130 as well as the location of the third identifier 130 on the security seal can be changed from one container to another.

The fourth identifier 140 can be any suitable identifier, for example, a QR code, a bar code, a serial number, an RFID tag, or a combination thereof. The fourth identifier can be located below and adjacent to the third identifier 130, on the security seal of the container 100.

The communications module 150 is configured to be accessed by the user U to interact with each of the identifiers included in the container 100. In some implementations, the user U is a consumer who wants to authenticate the container 100 before using the consumer product housed therein. The communications module 150 is further configured to allow two-way communication with the processing module 160. The communications module 150 can be any suitable communications module, for example, a computer, a smart phone, smart phone app, a tablet, tablet app, etc., and can be configured for wired (e.g., USB or firewire) and/or wireless (e.g., Wi-Fi, Bluetooth®, low powered Bluetooth®, Zigbee, and the like) communication with the processing module 160.

In some embodiments, the communications module 150 can be configured to interact with at least one of the identifiers 110, 120, 130, 140. For example, the communications module 150 can include an imaging system, for example, one or more cameras, a bar code scanner, and/or the like, configured to scan, image, and/or read at least one of the identifiers. In an example embodiment, the user U uses the communications module 150 to scan the first identifier 110, such as by taking a photo of the first identifier 110, and the communications module 150 communicates the first identifier 110 to the processing module 160.

In some embodiments, the communications module 150 can include a user input interface, for example, a button, a switch, an alphanumeric keypad, and/or a touch screen. The user input interface can be configured to allow manual entry of information about at least one of the identifiers included in the container 100 into the communications module 150, for example, identifier serial number (e.g., the second identifier 120 or the fourth identifier 140), type and/or location of identifier (e.g., type of image and or location of third identifier 130).

In some embodiments, the communications module 150 can also include a display configured to communicate information to a user, for example, display a web portal, a smart phone app, etc., and provide visual cues to the user U, for example, the correct sequence for accessing each of the identifiers, container authentic, container counterfeit, product name, batch number, lot number, product manufacturing date, expiry date, price, and any other information relevant to the user U. In some embodiments, the communications module 150 can also include audible alerts and/or voice recognition to allow verbal communication with the user.

The processing module 160 receives information of each of the identifiers, for example, bar code information, serial number, image type, image of at least one of the identifiers, or identifier location, from the communication module 150 and processes the information to authenticate the container 100. The processing unit 160 can include a local computer, a remote server, a cloud server (e.g., Cisco® secure cloud), a smart phone app, or a tablet app. In some embodiments, the processing unit 160 can be a cloud server (e.g., Cisco® secure cloud) which can be accessed over the internet and/or local network. The processing module 160 can include a memory that is configured to temporarily store information from each of the identifiers. In some embodiments, the memory can also include a reference database of identifier authentication data, for example, bar code data, serial number data, image data, and/or image location data. The processing module 160 can be configured to associate at least one of the first identifier 110, the second identifier 120, the third identifier 130, and the fourth identifier 140 data with the reference database to authenticate the container 100. In some embodiments, crawling technology can be used to detect counterfeiting using the internet. In some embodiments, the processing module may store authentication information such that the container 100 can be authenticated offline, such a without an internet or 3G, 4G, or LTE connection.

Each of the first identifier 110, the second identifier 120, the third identifier 130, and the fourth identifier 140 can be used in any predetermined combination to authenticate the container 100. For example, in some embodiments, the user U can start authenticating the container 100 by first scanning the first identifier 110 using a scanner associated with the communications module 150. The processing module 160 can compare the information of the first identifier 110 with the reference database to authenticate the first identifier 110. Once the first identifier 110 is authenticated, the communications module 150 can prompt the user to scan the second identifier 120 or to enter information of the second identifier 120 (e.g., serial number) manually into the communications module 150, for example, via a web portal, or app. Once the second identifier 120 is also authenticated by the processing module 160, the communications module 150 can prompt the user to enter information of the third identifier 130, for example, type of image and/or location of image. After the third identifier 130 has been authenticated by the processing module 160, the communications module 150 can prompt the user U to scan or input information of the fourth identifier 140 (e.g., serial number). If the fourth identifier 140 is also authenticated by the processing module 160, the user U is informed by the communications module 150 that the container 100 is authentic, and thereby the product contained therein is not a counterfeit. If any of the identifiers is not authenticated by the processing module 160, the user U is informed by the communications module 150 that the container 100 is not authentic and that the product contained therein may be counterfeit. In some embodiments, the communications module 150 may alert the consumer using a visible alert, such as by displaying a message on the display, an audio alert, such as with an alarm, a tactile alert, such as by vibration, and/or a combination thereof.

Figure 2:
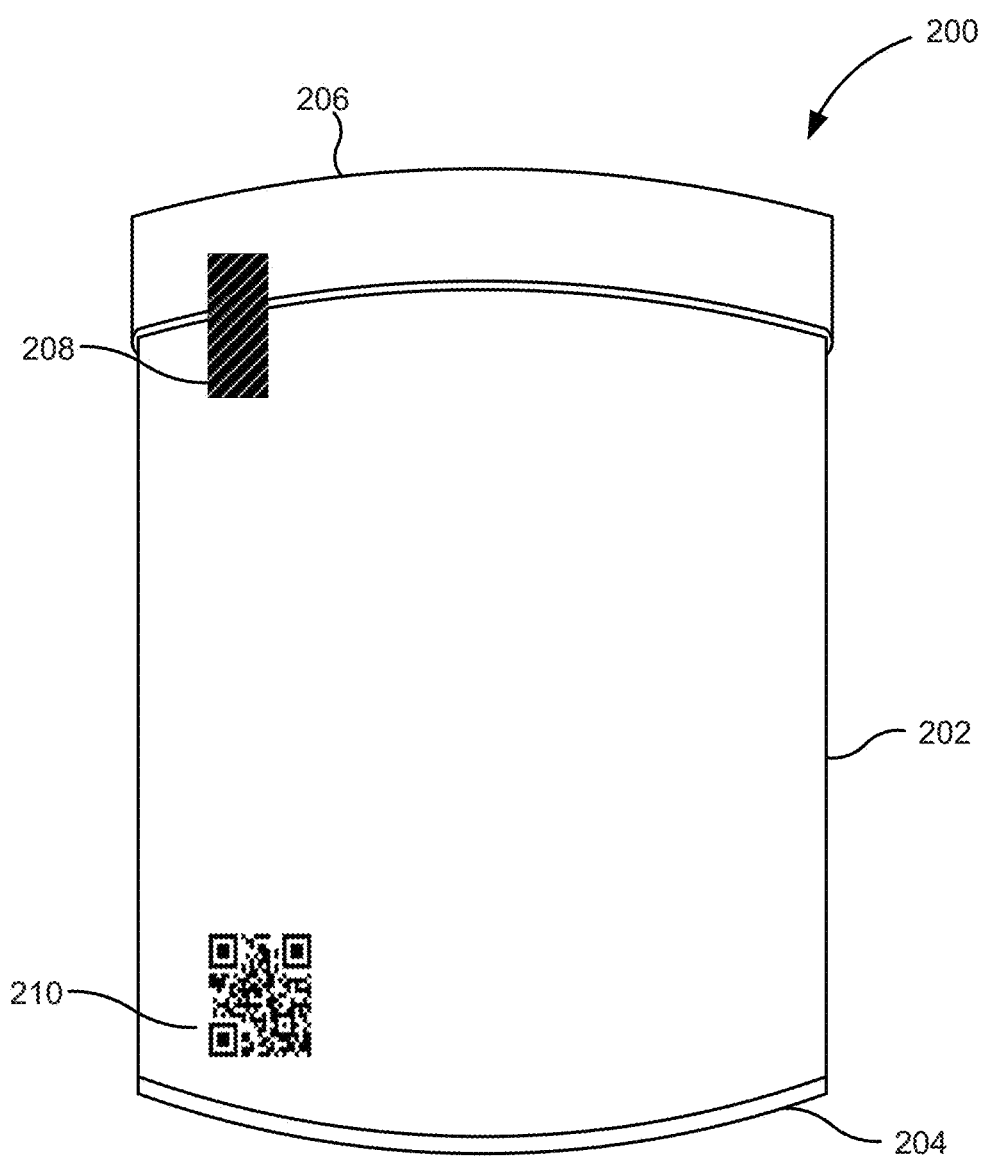
FIG. 2 is a side view of a container which includes a plurality of identifiers according to an embodiment.

In some embodiments, the authentication system, which includes the plurality of identifiers as described herein, can be used with a cylindrical container, for example, a baby formula container. Referring now to FIG. 2-4, a cylindrical container 200 includes an arcuate sidewall 202 and a flat base 204. The container 200 can be made from any suitable material, for example, metal (e.g., aluminum), plastic, cardboard, any other suitable material or combination thereof. The container 200 defines an internal volume that contains a product, for example, a consumer product (e.g., baby formula, baby cereal, supplements, milk, cookies, beverages, hair products, etc.), a medical product, or any other product that can be counterfeited. The container 200 defines an opening which is hermetically sealed by a security seal 207 (FIG. 4), for example, a plastic sheet, a metal foil, or any other suitable seal. In some embodiments, the security seal 207 includes a pull tab 209, which can be used to remove the security seal 207 in order to access the product. The security seal 207 protects the product from degradation by environmental factors, such as moisture, and also provides a security feature. For example, a removed or ruptured security seal 207 on a freshly acquired product would imply that the container 200 was tampered with and/or contains a counterfeit or a sub-standard product.

A lid 206 is disposed on the container 200 over the security seal 207 to protect the security seal 207, and to provide a permanent lid for the container 200 after the security seal 207 is removed. The lid 206 can be made from plastic, metal, rubber, or any other suitable material or combination thereof. A security tab 208 is disposed on the sidewall 202 of the container 200, such that at least a portion of the security tab 208 is also disposed on a sidewall of the lid 206. The security tab 208 can be a paper, a plastic, or a metal strip that can be disposed on the container 200 using an adhesive. The security tab 208 is operative to tear or break when the lid 206 is opened for the first time. A broken security tab 208 would therefore indicate that the lid 206 of the container 200 was opened and the product contained therein may be a counterfeit product.

A first identifier 210 is disposed on the sidewall 202 of the container 200. The first identifier 210 can be, for example, a QR code, a bar code, a serial number, an RFID tag, or a combination thereof. In some embodiments, the first identifier 210 can be a QR code which can be scanned by a scanner associated with a communications module, for example, the communications module 160 described with respect to FIG. 1. In some embodiments, the first identifier 210 can be etched on the sidewall 202 of the container 200 or printed on the container 200. In some embodiments, the identifier 210 can be printed on a suitable material, for example, paper, and affixed to the sidewall 202 of the container 200 using an adhesive. In some embodiments, the first identifier 210 can be included in another indicia, for example, product labels disposed on (e.g., affixed to or shrink wrapped on) the sidewall 202 of the container 200.

FIG. 3 shows a bottom view of the container 200. As shown in FIG. 3, a second identifier 220 is disposed on the base of the container. The second identifier 220 can be a laser etched GTIN 2D bar code, which also includes a human readable serial number. In some embodiments, the second identifier 220 can be, for example, a QR code, a bar code, a serial number, an RFID tag, or a combination thereof. In some embodiments, the second identifier 220 can be scanned by a scanner associated with the communications module, for example, the communications module 160 described with respect to FIG. 1. In some embodiments, a user can enter the human readable serial number included in the second identifier 220 into the communications module, for example, on a web portal or app, displayed on the communications module. The communications module can prompt the user to enter the second identifier 220 information into the web portal or app after the first identifier 210 has been authenticated by the processing module, for example, the processing module 160. In another embodiment, the communications module can prompt the user to scan the second identifier 220 directly into the web portal or app.

FIG. 4 shows a top view of the container 200 with the lid 206 removed. As shown in FIG. 4, a third identifier 230 is disposed on the security seal 207 of the container 200. The third identifier 230 can include an image, for example, an image of an animal, scenery, or any other suitable image, visual cue, or a combination thereof. In some embodiments, the image included in the third identifier 230 can be an image of at least one of four predetermined animals such as, for example, a cow, a cat, a dog, and a bird. The third identifier 230 can be disposed at a predetermined location, for example, a top right quadrant, a top left quadrant, a bottom right quadrant, or a bottom left quadrant of the security seal. The quadrants are marked on the security seal, for example, using orthogonal lines. In some embodiments, the quadrants are marked with numbers, Roman numerals, letters, and/or the like. The third identifier 230 can be printed on the security seal or printed on an adhesive indicia which is then affixed on the security seal. In some embodiments, the communications module, for example, the communications module 150, can prompt the user to enter the type of image (e.g., "What animal is in the image?") included in the third identifier 230 as well as the location of the third identifier 230 into the communications module after the second identifier 220 has been authenticated by the processing module, for example, the processing module 160. In another embodiment, the communications module 150 can display what the image is and the location of the image, which the user U can identify and confirm that the image and image location are correct.

The fourth identifier 240 is also located on the security seal 207. In some embodiments, the fourth identifier 240 can be located adjacent to the third identifier 230, for example, below the third identifier 230. The fourth identifier 240 can be a serial number. In some embodiments, the fourth identifier 240 can be any other identifier, for example, a bar code or a QR code. In some embodiments, the communications module, for example the communications module 150, can prompt the user to enter information of the fourth identifier 240 after the third identifier 230 has been authenticated by the processing module, for example, processing module 160. If all four identifiers are authenticated, the product is deemed authentic. If any of the four identifiers are not authenticated, the product can be deemed to be counterfeit.

Figure 5:
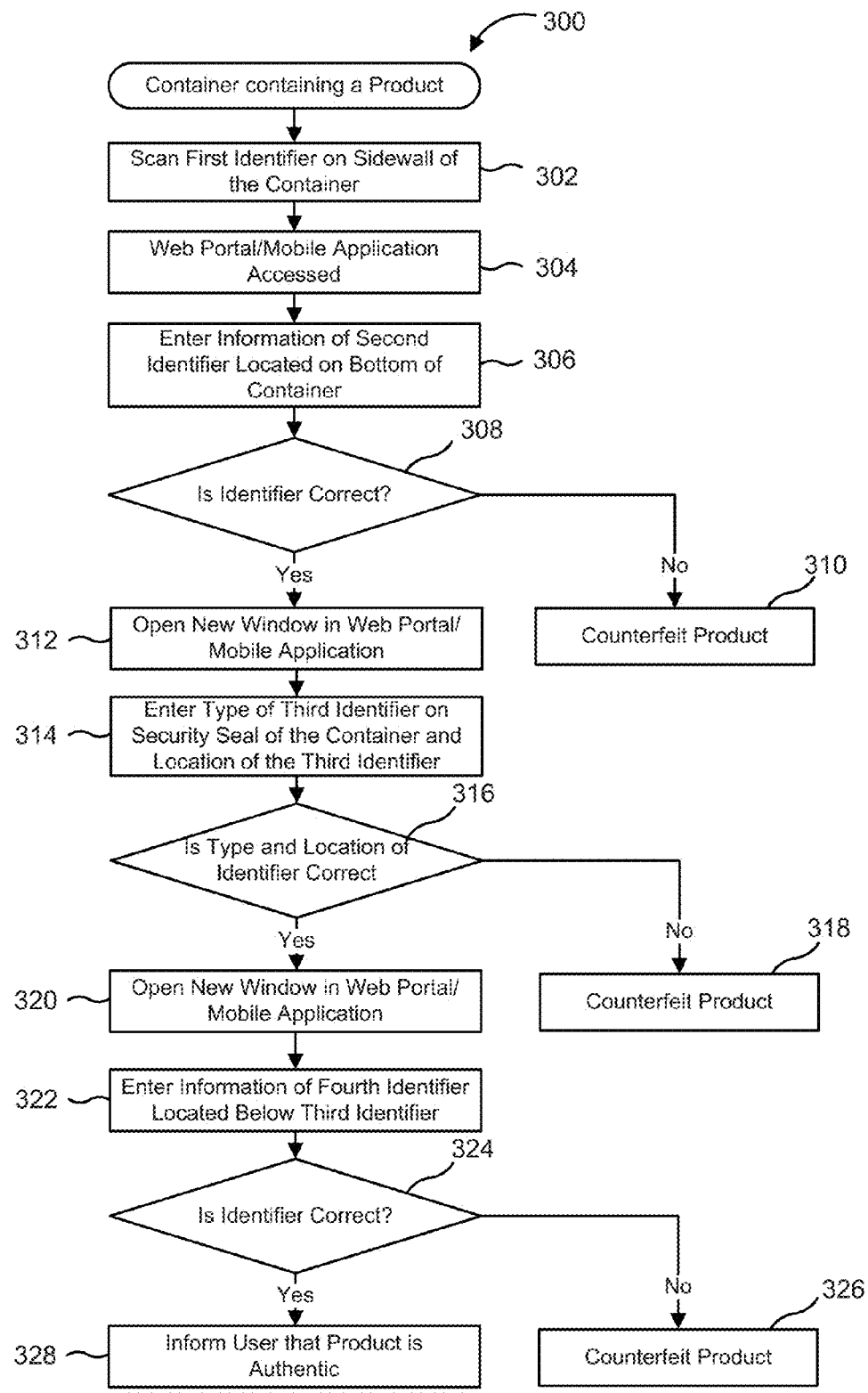
FIG. 5 illustrates a flow diagram showing a method of authenticating a container.

FIG. 5 illustrates a flow diagram showing an exemplary method 300 for authenticating a container, for example, the container 200 or any other container described herein, using a plurality of identifiers associated with the container. A container, for example, the container 200 as described with respect to FIG. 2, can include a first identifier, a second identifier, a third identifier and a fourth identifier associated with it for authenticating the container. To begin authenticating the container, for example, container 200, a user scans a first identifier disposed on a sidewall of the container 302. The first identifier can be substantially similar to the first identifier 210 or any other first identifier described herein, and can include, for example, a QR code. The scanner can be, for example, a QR code or bar code scanner, and can be associated with a communications module, for example communications module 150, or any other communications module described herein. Scanning of the first identifier accesses a web portal or mobile app 304 on the communications module. The communications module can be in two-way communication with a processing module, for example, the processing module 160 or any other processing module described herein. The first identifier information can be communicated by the communications module to the processing module, such that the processing module authenticates the first identifier. In some embodiments, the authentication of the first identifier prompts the communications module to open a user accessible web portal or mobile phone app, while in other embodiments, the first identifier is authenticated within the user accessible web portal or mobile phone app.

Once the web portal or mobile app is open, the user enters the information of the second identifier (e.g., serial number), which is located at the bottom of the container 306 in an appropriate data entry box of the web portal or mobile app. The second identifier can be substantially similar to the second identifier 220 described with respect to FIG. 2 or any other second identifier described herein. In another embodiment, the second identifier can be scanned by the communications module. The communications module can communicate the second identifier information to the processing module to determine if the second identifier is correct 308. If the second identifier is not authenticated, the container is determined to contain a counterfeit product 310. If the second identifier is authenticated, a first window opens in the web portal or mobile app 312 on the communications module, prompting the user to enter information of the third identifier. The third identifier can be substantially similar to the third identifier 230 or any third identifier described herein, and can be disposed on a security seal included in the container, for example, security seal 207 included in the container 200. The user then enters the type of image (e.g., what animal is in the image included in the third identifier) and the location of the image (e.g., which quadrant of the security seal is the third identifier located in) 314 into the second window. This information is communicated to the processing module, where the processing module determines if the type and location of the third identifier is correct 316. In some embodiments, the user types the type and location of the image, whereas in other embodiments, the user can take a photo of the image and the processing module determines whether the image and location of the image are authentic. If the third identifier is not authenticated, the processing module informs the user via the communications module that the product is a counterfeit 318.

If the third identifier is authenticated, the processing module prompts the communication module to open a second window in the web portal or mobile application 320. The third window prompts the user to enter information of fourth identifier located below the third identifier 322. The fourth identifier can include any of the fourth identifiers described herein, for example, the fourth identifier 240 described with respect to FIG. 2. The communications module communicates the fourth identifier information to the processing module for determining if the fourth identifier is correct 324. If the fourth identifier does not match the reference database stored in the processing module, the processing module communicates to the user via the communication module that the product is a counterfeit 326. If the fourth identifier is authenticated, the user is informed that the product is authentic, for example, by displaying a "safe to consume" message.

Although various embodiments have been described as having particular features and/or combinations of components, other embodiments are possible having a combination of any features and/or components from any of embodiments as discussed above. For example, while embodiments described herein referred to authentication of the first identifier, the second identifier, the third identifier and the fourth identifier in that order, in some embodiments, the order can be changed. Similarly the location of each of the identifier on the container can be varied. In some embodiments, all the identifiers can be machines readable identifiers, for example, QR codes or bar codes. In addition, the specific configurations of the various components can also be varied. For example, the size and specific shape of the various components can be different than the embodiments shown, while still providing the functions as described herein.

The invention claimed is:

1. A method of authenticating an item, the method comprising:

receiving, at a processor, a first identifier and a second identifier from a communications module, the first and second identifiers located on the item;

authenticating the first identifier and the second identifier;

requesting an input of at least one feature of a third identifier via the communications module;

receiving, at the processor, the at least one feature of the third identifier from the communications module;
verifying the at least one feature of the third identifier;
requesting an input of a fourth identifier via the communications module;
receiving, at the processor, the fourth identifier from the communications module;
determining an authenticity of the item based on a combination of the first, second, third, and fourth identifiers compared to at least one predetermined combination; and
displaying an output indicating the authenticity of the item via the communications module.

2. The method of claim 1, wherein the authenticity of the item is determined by comparing the combination of the first, second, third, and fourth identifiers with a reference database, the reference database storing information associated with the at least one predetermined combination.

3. The method of claim 2, wherein the at least one predetermined combination is a predetermined order by which the first, second, third, and fourth identifiers are received.

4. The method of claim 2, wherein:
the item is authentic when the combination matches any of the at least one predetermined combination; and
the item is not authentic when the combination fails to match any of the at least one predetermined combination.

5. The method of claim 1, wherein the first identifier is at least one of: a QR code, a bar code, a serial number, and an RFID tag.

6. The method of claim 1, wherein the second identifier is at least one of: a QR code, a bar code, a serial number, and an RFID tag.

7. The method of claim 1, wherein the at least one feature of the third identifier is at least one of an image type and an image location.

8. The method of claim 7, wherein the image location is a quadrant on a security seal of the item.

9. The method of claim 1, wherein the fourth identifier is at least one of: a QR code, a bar code, a serial number, and an RFID tag.

10. A method for authenticating an item, the method comprising:
instantiating an input application;
receiving an indication to scan the item;
scanning a first identifier;
displaying a prompt for the user to scan a second identifier;
scanning the second identifier;
displaying a prompt for the user to input at least one feature of a third identifier;
receiving the user input of the at least one feature of the third identifier;
prompting the user to provide a fourth identifier;
at least one of scanning and receiving user input of the fourth identifier;
determining an authenticity of the item based on the first, second, third, and fourth identifiers and an order by which the first, second, third, and fourth identifiers are received compared to at least one predetermined order; and
displaying an indication of the authenticity of the item.

11. The method of claim 10, wherein the at least one feature is an image type.

12. The method of claim 10, wherein the at least one feature is an image location.

13. The method of claim 10, wherein the input application is instantiated on any one of: a mobile device, a smart phone, a tablet, an internet web browser, and a mobile internet web browser.

14. The method of claim 10, wherein the item is authentic when the order matches any of the at least one predetermined order.

15. The method of claim 10, wherein the item is not authentic when the order fails to match any of the at least one predetermined order.

16. The method of claim 15, wherein the indication that the item is not authentic includes at least one of a visual display and an auditory alarm.

17. A system for authenticating an item, comprising:
a processor;
a first identifier, a second identifier, a third identifier, and a fourth identifier, at least one of the first identifier, the second identifier, the third identifier, and the fourth identifier is located at a different location on packaging of the item than at least one of the other identifiers;
a scanner, the scanner configured to scan at least the first identifier and the second identifier;
an input application, the input application configured to receive at least the third identifier;
a processor configured to receive information on the first identifier, the second identifier, the third identifier, and the fourth identifier and determine an authenticity of the item based on a comparison of a combination of the received information to at least one predetermined combination; and
an output display configured to display at least the authenticity of the item.

18. The system of claim 17, wherein the input application is configured to receive the fourth identifier.

19. The system of claim 17, wherein the scanner is configured to scan the fourth identifier.

20. The system of claim 17, wherein scanner and the input application are incorporated within a single device.

21. The system of claim 17, wherein the scanner and the input application transmit information via the processor to a processing module, wherein the identifiers are authenticated on the processing module, and the authenticity is transmitted, via the processor to the output display.

22. The system of claim 17, wherein the processor determines the authenticity of the item based on the first identifier, the second identifier, the third identifier, the fourth identifier, and an order by which the first identifier, the second identifier, the third identifier, and the fourth identifier are received compared to at least one predetermined order.

23. The system of claim 17, wherein the third identifier comprises an image type and an image location, wherein both the image type and the image location are verified by the processor in determining the authenticity of the item.

* * * * *